(12) United States Patent
Liu (10) Patent No.: US 9,919,250 B2
(45) Date of Patent: Mar. 20, 2018

(54) FILTERS FOR OIL-WATER SEPARATION HAVING ZWITTERIONIC POLYMERS COATED OR GRAFTED THEREON

(71) Applicant: Lingyun Liu, Tallmadge, OH (US)

(72) Inventor: Lingyun Liu, Tallmadge, OH (US)

(73) Assignee: THE UNIVERSITY OF AKRON, Akron, OH (US)

(*) Notice: Subject to any disclaimer, the term of this patent is extended or adjusted under 35 U.S.C. 154(b) by 299 days.

(21) Appl. No.: 14/169,730

(22) Filed: Jan. 31, 2014

(65) Prior Publication Data

US 2014/0209534 A1 Jul. 31, 2014

Related U.S. Application Data

(60) Provisional application No. 61/758,862, filed on Jan. 31, 2013.

(51) Int. Cl.
  *C09K 3/32* (2006.01)
  *B01D 39/20* (2006.01)
  *B01D 39/00* (2006.01)

(52) U.S. Cl.
  CPC ......... *B01D 39/2017* (2013.01); *B01D 39/00* (2013.01); *B01D 2239/0421* (2013.01)

(58) Field of Classification Search
  CPC ............ B01D 2239/0421; B01D 39/00; B01D 39/2017

USPC ....................................... 210/502.1; 427/244
See application file for complete search history.

(56) References Cited

U.S. PATENT DOCUMENTS

| 5,368,733 | A  | * | 11/1994 | Nakabayashi | A61L 33/08 210/500.23 |
| 2006/0000778 | A1 | * | 1/2006 | Childs | B01D 61/362 210/644 |
| 2009/0155335 | A1 | * | 6/2009 | O'Shaughnessey | A61L 15/46 424/423 |
| 2012/0048799 | A1 | * | 3/2012 | Na | B01D 69/125 210/490 |
| 2012/0116424 | A1 | * | 5/2012 | Lee | A61L 24/046 606/151 |
| 2013/0190672 | A1 |   | 7/2013 | Liu | |

* cited by examiner

*Primary Examiner* — Dirk Bass
(74) *Attorney, Agent, or Firm* — Renner Kenner Greive Bobak Taylor & Weber (57) ABSTRACT

A filter for the separation of oil and water from oil-water mixtures comprising a porous filter media, wherein the porous filter media has a zwitterionic polymer grafted or coated thereon. The zwitterionic polymers can be formed from zwitterionic monomers, the zwitterionic polymers having positive and negative charges in series on the same side chain; zwitterionic polymers formed from a mixture of cationic and anionic monomers, the zwitterionic polymers having positive and negative charges on two different side chains; and zwitterionic polymers formed from monomers with cationic-anionic pairs, the zwitterionic polymers having positive and negative charges in parallel on the same side chain.

11 Claims, 7 Drawing Sheets

FILTERS FOR OIL-WATER SEPARATION HAVING ZWITTERIONIC POLYMERS COATED OR GRAFTED THEREON

CROSS-REFERENCE TO RELATED APPLICATION

This application is a non-provisional of U.S. Patent Provisional Application No. 61/758,862, filed on Jan. 31, 2013, the contents of which are incorporated herein by reference.

FIELD OF THE INVENTION

The present invention relates to an improved filter and an associated method of use. In particular embodiments, the present invention relates to a filter that is used for oil-water separation by having zwitterionic polymers coated or grafted thereon. In other particular embodiments, the present invention relates to glass fiber filters that are grafted with poly (sulfobetaine methacrylate).

BACKGROUND OF THE INVENTION

Separation of oil and water has been a worldwide challenge for some time. Oil-water separation is necessary due to increasing environmental awareness and regulations. Also, the production of industrial wastewater and accidental spillage of oil leads to a need for oil-water separation.

Certain efforts to increase the effectiveness of oil-water separation have involved the creation of devices that have hydrophobic-oleophilic (i.e. oil-removing) surfaces or hydrophilic-oleophobic (i.e. water-removing) surfaces. However, oil-removing surfaces tend to foul easily and become blocked by oils. These oils adhere to the surfaces and are hard to remove. This greatly affects the separation efficiency.

Substrates that have been previously studied for oil-water separation include polymers, such as polytetrafluoroethylene (PTFE), polyethylene, and polyurethane; metals, such as stainless steel and copper; ceramics, such as glass and manganese oxide; and others, such as filter paper, textile, and silicon. These have been in the form of fibers, meshes, foams, or surfaces. Certain embodiments of these substrates offer inferior properties, such as low flexibility and poor mechanical stability. Hydrophilic-oleophobic surfaces have been incorporated into certain embodiments of these substrates; however, the resultant substrates have not yet been used for oil-water separation.

Altering the wettability of a surface also affects the oil-water separation. The wettability of a surface can be changed by using surface modification techniques in order to achieve antifouling surfaces. Such techniques include vapor deposition, dip coating, spray coating, spin coating, and polymer grafting. A surface having superoleophobic properties generally requires the use of a hydrophilic material and hierarchical surface structures. Superoleophobic surfaces generally require the combination of surface chemistry and surface roughness properties.

The present invention employs zwitterionic species to modify the properties of filter media and provide an improved filter that provides more effective oil-water separation. Embodiments of the present invention offer one or more of the following improved properties: easy production, easy re-use or recycling, high resistance to organic contaminants (such as oil), high separation efficiency, low operating costs, and the use of highly roughed surfaces (e.g., nanostructured surfaces) is not necessary.

SUMMARY OF THE INVENTION

In a first embodiment, the present invention provides a filter for the separation of oil and water from oil-water mixtures comprising a porous filter media, wherein the porous filter media has a zwitterionic polymer grafted or coated thereon.

In a second embodiment, the present invention provides a filter as in the first embodiment, wherein the zwitterionic polymer is selected according to the following structure:

wherein X is selected from the group consisting of hydrogen or a methyl group; Y is selected from the group consisting of an ester and an amide; n is an integer from 1 to 4, m is an integer from 1 to 5, Z is selected from the group consisting of $SO_3$ or COO; and $R_1$, $R_2$ and $R_3$ are each any moiety.

In a third embodiment, the present invention provides a filter as in either the first or second embodiments, wherein the zwitterionic polymer employs the first structure and X is methyl, Y is ester, n is 2, m is 3, and Z is $SO_3$.

In a fourth embodiment, the present invention provides a filter as in any of the first through third embodiments, wherein the zwitterionic polymer employs the first structure and X is methyl, Y is ester, n is 2, m is 2, and Z is COO.

In a fifth embodiment, the present invention provides a filter as in any of the first through fourth embodiments, wherein the zwitterionic polymer employs the first structure and X is hydrogen, Y is amide, n is 2, m is 1, 3, or 5, and Z is COO.

In a sixth embodiment, the present invention provides a filter as in any of the first through fifth embodiments, wherein the zwitterionic polymer employs the second structure and X is methyl, Y is ester, n is 2, m is 2 and $R_1$, $R_2$ and $R_3$ are each a methyl group.

In a seventh embodiment, the present invention provides a filter as in any of the first through sixth embodiments, wherein the porous filter media comprises glass fibers.

In an eighth embodiment, the present invention provides a filter as in any of the first through seventh embodiments, wherein the zwitterionic polymer is selected from the group consisting of poly(carboxybetaine methacrylate) (pCBMA), poly(sulfobetaine methacrylate) (pSBMA), poly(2-methacryloyloxyethyl phosphorylcholine) (pMPC), poly(serine methacrylate), and polyampholyte mixed-charge copolymers.

In a ninth embodiment, the present invention provides a filter as in any of the first through eighth embodiments, wherein the zwitterionic polymer is a polyampholyte mixed-charge copolymer comprising a positively charged monomer selected from the group consisting of quaternary amine monomers and protonated primary amine monomers, wherein the quaternary amine monomer, if present, is selected from the group consisting of [2-(acryloyloxy)ethyl] trimethyl ammonium chloride and [2-(methacryloyloxy) ethyl]trimethyl ammonium chloride; and a negatively charged acrylate monomer selected from the group consisting of 2-carboxy ethyl acrylate and 3-sulfopropyl methacrylate potassium salt.

In a tenth embodiment, the present invention provides a filter as in any of the first through ninth embodiments, wherein the zwitterionic polymer is made from a monomer selected from the group consisting of N-ε-methacryloyl lysine, N-δ-methacryloyl ornithine, $N^4$-(2-methacrylamidoethyl) asparagine, and $N^5$-(2-methacrylamidoethyl) glutamine.

In an eleventh embodiment, the present invention provides a filter as in any of the first through tenth embodiments, wherein the filter has a water contact angle of approximately 8-15° and an underwater oil contact angle of approximately 162-169°.

In a twelfth embodiment, the present invention provides a method of forming a filter comprising the steps of providing a porous filter media; providing a zwitterionic polymer; and coating or grafting a zwitterionic polymer onto a surface of the filter media.

In a thirteenth embodiment, the present invention provides a method as in the twelfth embodiment, wherein the substrate comprises glass fibers.

In a fourteenth embodiment, the present invention provides a method as in either the twelfth or thirteenth embodiments, wherein the zwitterionic polymer is selected from the group consisting of poly(carboxybetaine methacrylate) (pCBMA), poly(sulfobetaine methacrylate) (pSBMA), poly (2-methacryloyloxyethyl phosphorylcholine) (pMPC), poly (serine methacrylate), and polyampholyte mixed-charge copolymers.

In a fifteenth embodiment, the present invention provides a method as in any of the twelfth through fourteenth embodiments, wherein said step of coating or grafting is a step of grafting, and the method further comprises securing an anchor initiator to the surface of the filter media and said step of grafting includes initiating polymerization of monomers with the anchor initiator to form the zwitterionic polymer.

In a sixteenth embodiment, the present invention provides a method as in any of the twelfth through fifteenth embodiments, wherein the anchor initiator is an atom transfer radical polymerization initiator and the zwitterionic polymer is grafted using atom transfer radical polymerization of the monomers.

In a seventeenth embodiment, the present invention provides a method as in any of the twelfth through sixteenth embodiments, wherein the monomers polymerized in said step of grafting are selected from: zwitterionic monomers, forming zwitterionic polymers having positive and negative charges in series on the same side chain; a mixture of cationic and anionic monomers, forming zwitterionic polymers having positive and negative charges on two different side chains; and monomers with cationic-anionic pairs, forming zwitterionic polymers having positive and negative charges in parallel on the same side chain.

In an eighteenth embodiment, the present invention provides a method as in any of the twelfth through seventeenth embodiments, wherein the monomers are a mixture of cationic and anionic monomer, the cationic monomer selected from the group consisting of quaternary amine monomers and protonated primary amine monomers, wherein the quaternary amine monomer, if employed, is selected from the group consisting of [2-(acryloyloxy)ethyl] trimethyl ammonium chloride and [2-(methacryloyloxy) ethyl]trimethyl ammonium chloride, and the anionic monomer is an acrylate monomer selected from the group consisting of 2-carboxy ethyl acrylate and 3-sulfopropyl methacrylate potassium salt.

In a nineteenth embodiment, the present invention provides a method as in any of the twelfth through eighteenth embodiments, wherein the monomers are monomers with cationic-anionic pairs selected from the group consisting of N-ε-methacryloyl lysine, N-δ-methacryloyl ornithine, $N^4$-(2-methacrylamidoethyl) asparagine, and $N^5$-(2-methacrylamidoethyl) glutamine.

In a twentieth embodiment, the present invention provides a method as in any of the twelfth through nineteenth embodiments, wherein the coating or grafting step is a step of coating.

In a twenty-first embodiment, the present invention provides a method as in any of the twelfth through twentieth embodiments, wherein the zwitterionic polymer in said step of coating is selected from: zwitterionic polymers formed from zwitterionic monomers, the zwitterionic polymers having positive and negative charges in series on the same side chain; zwitterionic polymers formed from a mixture of cationic and anionic monomers, the zwitterionic polymers having positive and negative charges on two different side chains; and zwitterionic polymers formed from monomers with cationic-anionic pairs, the zwitterionic polymers having positive and negative charges in parallel on the same side chain.

In a twenty-second embodiment, the present invention provides a method as in any of the twelfth through twenty-first embodiments, wherein the zwitterionic polymer is a zwitterionic polymer formed from mixtures of cationic and anionic monomer, the cationic monomer selected from the group consisting of quaternary amine monomers and protonated primary amine monomers, wherein the quaternary amine monomer, if employed, is selected from the group consisting of [2-(acryloyloxy)ethyl]trimethyl ammonium chloride and [2-(methacryloyloxy)ethyl]trimethyl ammonium chloride, and the anionic monomer is an acrylate monomer selected from the group consisting of 2-carboxy ethyl acrylate and 3-sulfopropyl methacrylate potassium salt.

In a twenty-third embodiment, the present invention provides a method as in any of the twelfth through twenty-second embodiments, wherein the zwitterionic polymer is a zwitterionic polymer formed from monomers with cationic-anionic pairs, the monomers with cationic-anionic pairs being selected from the group consisting of N-ε-methacryloyl lysine, N-δ-methacryloyl ornithine, $N^4$-(2-methacrylamidoethyl) asparagine, and $N^5$-(2-methacrylamidoethyl) glutamine.

In a twenty-fourth embodiment, the present invention provides a method of using a filter for the separation of oil and water from oil-water mixtures comprising the steps of: providing a mixture or emulsion comprising oil and water; providing a porous filter media; coating or grafting a zwitterionic polymer onto the porous filter media; allowing the oil and water mixture or emulsion to contact the porous filter media, whereby the porous filter media allows the water to pass through.

In a twenty-fifth embodiment, the present invention provides a method as in the twenty-fourth embodiment, wherein the filter substrate comprises glass fibers.

In a twenty-sixth embodiment, the present invention provides a method as in either the twenty-fourth or twenty-fifth embodiments, wherein the zwitterionic polymer is selected from the group consisting of poly(carboxybetaine methacrylate) (pCBMA), poly(sulfobetaine methacrylate) (pSBMA), poly(2-methacryloyloxyethyl phosphorylcholine) (pMPC), poly(serine methacrylate), and polyampholyte mixed-charge copolymers.

In a twenty-seventh embodiment, the present invention provides a method as in any of the twenty-fourth through twenty-sixth embodiments, wherein the zwitterionic polymer is a polyampholyte mixed-charge copolymer comprising: a positively charged monomer selected from the group consisting of quaternary amine monomers and protonated primary amine monomers, wherein the quaternary amine monomer, if present, is selected from the group consisting of [2-(acryloyloxy)ethyl]trimethyl ammonium chloride and [2-(methacryloyloxy)ethyl]trimethyl ammonium chloride, and a negatively charged acrylate monomer selected from the group consisting of 2-carboxy ethyl acrylate and 3-sulfopropyl methacrylate potassium salt.

In a twenty-eighth embodiment, the present invention provides a method as in any of the twenty-fourth through twenty-seventh embodiments, wherein the zwitterionic polymer is made from a monomer selected from the group consisting of N-$\epsilon$-methacryloyl lysine, N-$\delta$-methacryloyl ornithine, $N^4$-(2-methacrylamidoethyl) asparagine, and $N^5$-(2-methacrylamidoethyl) glutamine.

BRIEF DESCRIPTION OF THE DRAWINGS

Advantages of the present invention will become better understood with regard to the following description, appended claims, and accompanying drawings provided herein.

DETAILED DESCRIPTION OF ILLUSTRATIVE EMBODIMENTS

The present invention relates to an improved filter and an associated method of use. In one or more embodiments, the present invention relates to a filter that is used for oil-water separation, the filter including a porous filter media and zwitterionic polymers coated or grafted on the porous filter media. Methods of forming the filters of this invention are also provided. As used herein, porous filter media can also be referred to as a substrate.

The porous filter media may be selected from any media provided with pores suitable for oil-water separation. In one or more embodiments, the porous filter media is chosen from the group consisting of polymers, metals, and ceramics. In one or more embodiments, the porous filter media is chosen from the group consisting of filter paper, textile, and silicon. In one or more embodiments, a polymeric filter media is chosen from the group consisting of polytetrafluoroethylene (PTFE), polyethylene, and polyurethane. In one or more embodiments, a metal filter media is chosen from the group consisting of stainless steel and copper. In one or more embodiments, a ceramic filter media is chosen from the group consisting of glass and manganese oxide. In one or more embodiments, the porous filter media is in a form selected from the group consisting of fibers, meshes, and foams. The filter must be porous in order for the water of an oil-water mixture to make its way through the filter.

The filter media provides mechanical strength for proper operation of the filter. The filter media must be strong enough such that the filter is able to handle the flow of a fluid, particularly an oil-water mixture. Coating or grafting a filter media with a zwitterionic polymer also provides other benefits, such as cost savings. The filter media having a zwitterionic polymer coated or grafted thereon is less expensive to produce than making a filter out of just the zwitterionic polymer.

In one or more embodiments, a filter is made from glass fiber filter media. Glass fiber filter media offers the particular advantages of having strong mechanical properties, good recyclability, low cost, and an easily modifiable surface.

In one or more embodiments, the filter media has an average pore size from 50 µm or more to 350 µm or less. In one or more embodiments, the average pore size is 30 µm or more. In one or more embodiments, the average pore size is 400 µm or less. In one or more embodiments, the average pore size is from 1 µm or more to 1000 µm or less, in other embodiments from 5 µm or more to 700 µm or less, and in other embodiments from 25 µm or more to 500 µm or less.

In some embodiments, the filter media is formed of woven or non-woven fibers. In some embodiments, the filter media is a non-woven fabric of fibers generated by electrospinning or nanofibers by gas jet processes. In some embodiments, the filter media is a woven fabric with warp and weft fibers in a weave selected from plain, twill, and satin.

In embodiments where the filter media is made from fibers, the average fiber diameter is 6.5 µm or approximate thereto. In one or more embodiments, the average fiber diameter is from 5 µm or more to 10 µm or less. In one or more embodiments, the average fiber diameter is 3 µm or more. In one or more embodiments, the average fiber diameter is 20 μm or less. In one or more embodiments, the average fiber diameter is from 1 μm or more to 25 μm or less.

In one or more embodiments, the filter media has a thickness of approximately 1.4 mm. In one or more embodiments, the filter thickness is from 1 mm or more to 5 mm or less. In one or more embodiments, the filter thickness is 0.5 mm or more. In one or more embodiments, the filter thickness is 20 mm or less. In one or more embodiments, the filter thickness is from 0.1 mm or more to 50 mm or less. In one or more embodiments, the filter media can be multi-layered.

A filter media is coated with or has zwitterionic polymers grafted thereto to form the filters in accordance with this invention. Zwitterionic polymers have beneficial superhydrophilic properties in an air environment and beneficial superoleophobic properties in an underwater environment. The underwater superoleophobic property prevents oil droplets from adhering to the polymers, which offers benefits with respect to oil separation and material recycling. Zwitterionic polymers also exhibit ultralow biofouling, which allows the filters to be rinsed and re-used. Filters of the present invention are also stable in water, providing the advantage that they do not dissolve in the present of water.

Zwitterionic polymers can be formed from various components, including: zwitterionic monomers, forming zwitterionic polymers having positive and negative charges in series on the same side chain; mixtures of cationic and anionic monomers, forming zwitterionic polymers having positive and negative charges on two different side chains; and monomers with cationic-anionic pairs, termed herein "Bingdi monomers", forming zwitterionic polymers having positive and negative charges in parallel on the same side chain. The word "Bingdi" originates from Chinese Bingdi lotuses which has two flowers in one stalk. Each of these categories will be further disclosed below.

In one or more embodiments, the present invention employs zwitterionic monomers according to the following structures:

wherein X is selected from the group consisting of hydrogen or a methyl group; Y is selected from the group consisting of an ester and an amide; n is an integer from 1 to 4, m is an integer from 1 to 5, Z is selected from the group consisting of $SO_3$ or COO; and $R_1$, $R_2$ and $R_3$ are each any moiety. In other embodiments, R1, R2 and $R_3$ are small alkyl groups (of from C1 to C3, i.e. methyl, ethyl or propyl groups).

In particular embodiments employing the first structure, X is methyl, Y is ester, n is 2, m is 3, and Z is $SO_3$, such that the monomer is sulfobetaine methacrylate (SBMA). In other embodiments, X is methyl, Y is ester, n is 2, m is 2, and Z is COO, such that the monomer is carboxybetaine methacrylate (CBMA). In still other embodiments, X is hydrogen, Y is amide, n is 2, m is 1, 3, or 5, and Z is COO, such that the monomer is carboxybetaine acrylamide (CBAA).

In particular embodiments employing the second structure, X is methyl, Y is ester, n is 2, m is 2 and $R_1$, $R_2$ and $R_3$ are each a methyl group, such that the monomer is 2-methacryloyloxyethyl phosphorylcholine (MPC).

In one or more embodiments, the monomers as described above are coated or grafted onto a filter media as polymers. In one or more embodiments, these polymers are grown off of suitably chosen anchor initiators secured to the material forming the desired filter media by polymerizing the monomers under suitable conditions. In other embodiments, these polymers are first created and then used to coat the filter media.

The polymers formed from the above monomers are represented by the following structures:

wherein X is selected from the group consisting of hydrogen or a methyl group; Y is selected from the group consisting of an ester and an amide; n is an integer from 1 to 4, m is an integer from 1 to 5, Z is selected from the group consisting of $SO_3$ or COO; and $R_1$, $R_2$ and $R_3$ are each any moiety. In one or more embodiments, R1, R2 and $R_3$ are small alkyl groups (of from C1 to C3, i.e. methyl, ethyl or propyl groups).

In particular embodiments employing the first structure, X is methyl, Y is ester, n is 2, m is 3, and Z is $SO_3$, such that the polymer is poly(sulfobetaine methacrylate) (pSBMA). In other embodiments, X is methyl, Y is ester, n is 2, m is 2, and Z is COO, such that the polymer is poly(carboxybetaine methacrylate) (pCBMA). In still other embodiments, X is hydrogen, Y is amide, n is 2, m is 1, 3, or 5, and Z is COO, such that the polymer is poly(carboxybetaine acrylamide) (pCBAA).

In particular embodiments employing the second structure, X is methyl, Y is ester, n is 2, m is 2 and $R_1$, $R_2$ and $R_3$ are each a methyl group, such that the polymer is poly(2-methacryloyloxyethyl phosphorylcholine) (pMPC).

Using the above polymers as examples, representations are provided below showing a polymer connected to an anchor that is grafted to a surface. The surface is representative of a surface of a filter media, and the anchor is representative of what remains from an anchor initiator after using the anchor initiator to graft a zwitterionic polymer to a surface.

Zwitterionic polymers can also be formed by polymerizing a mixture of cationic and anionic monomers. In one or more embodiments, these cationic and anionic monomers are mixed in substantially equimolar amounts. The resulting zwitterionic polymers have positive and negative charges on two different side chains.

In one or more embodiments, cationic monomers are selected from quaternary amine monomers and protonated primary amine monomers. In one or more embodiments, cationic monomers are selected from [2-(acryloyloxy)ethyl] trimethyl ammonium chloride and [2-(methacryloyloxy) ethyl]trimethyl ammonium chloride.

In one or more embodiments, anionic monomers are selected from acrylate monomers and methacrylate monomers. In one or more embodiments, anionic monomers are selected from 2-carboxy ethyl acrylate and 3-sulfopropyl methacrylate potassium salt.

Cationic monomers are those monomers having a cationic segment. An example of a useful cation segment is the quaternary ammonium cation, which has the general structure of

Anionic monomers are those monomers having an anionic segment. Examples of useful anionic segments are the sulfate anion, which has the general structure of and the carboxylate anion, which has the general structure of Appropriately chosen cationic and anionic monomers can be polymerized together to form zwitterionic polymers wherein the anionic and cationic segments extend off of the polymer backbone created during polymerization. These zwitterionic polymers would have a general formula of wherein the structure ⁓ generically represents a polymer backbone, and the side arms represent the portion of the cationic and anionic segments not incorporated into the polymer backbone during polymerization. It will be appreciated that the above formula is representative only and the polymer will contain a multitude of the anionic and cationic side chain segments. In one or more embodiments, the side chain segments are in a generally random arrangement. In one or more embodiments, different cationic monomers and different anionic monomers can be copolymerized to form a zwitterionic copolymer.

As described below, these monomers can be grafted to a surface by polymerizing with an appropriate anchor initiator. Using the above generic representation of a polymer as an example, a representation is provided below showing a polymer connected to an anchor that is grafted to a surface. The surface is representative of a surface of a filter media, and the anchor is representative of what remains from an anchor initiator after using the anchor initiator to graft a zwitterionic polymer to a surface.

Zwitterionic polymers can also be formed by using Bingdi monomers having both a positive and negative charge. These monomers are also known having cationic-anionic pairs. The resulting zwitterionic polymers have positive and negative charges in parallel on the same side chain.

In one or more embodiments, Bingdi monomers are selected from methacryloyl serine, N-ε-methacryloyl lysine, N-δ-methacryloyl ornithine, $N^4$-(2-methacrylamidoethyl) asparagine, or $N^5$-(2-methacrylamidoethyl) glutamine.

Bingdi monomers are those monomers that have a segment having both a positive and negative charge. An example, as shown below, is a carboxyl-amine pair that are both connected to a common carbon, which has the general structure of

In one or more embodiments, a Bingdi monomer includes the above segment with a quaternary ammonium cation instead of the primary amine cation. In one or more embodiments, a Bingdi monomer includes the above segment with a sulfate anion instead of the carboxylate anion.

Bingdi monomers, having both a positive and negative charge, form zwitterionic polymers having a general formula of wherein the structure ∼∼∼ generically represents a polymer backbone, and the side arms represent the portion of the Bingdi monomer not incorporated into the polymer backbone during polymerization. It will be appreciated that the above formula is representative only and the polymer will contain a multitude of the side chain segments. In one or more embodiments, the side chain segments are in a generally random arrangement. In one or more embodiments, different Bingdi monomers can be copolymerized to form a zwitterionic copolymer.

As described below, these monomers can be grafted to a surface by polymerizing with an appropriate anchor initiator. Using the above generic representation of a polymer as an example, a representation is provided below showing a polymer connected to an anchor that is grafted to a surface. The surface is representative of a surface of a filter media, and the anchor is representative of what remains from an anchor initiator after using the anchor initiator to graft a zwitterionic polymer to a surface.

Particular zwitterionic polymers include poly(carboxybetaine methacrylate) (pCBMA), poly(sulfobetaine methacrylate) (pSBMA), poly(2-methacryloyloxyethyl phosphorylcholine) (pMPC), which are all formed from betaine monomers. Other particular zwitterionic polymers include polyampholyte mixed-charge copolymers composed of positively charged quaternary amine monomers (e.g., [2-(acryloyloxy)ethyl]trimethyl ammonium chloride, [2-(methacryloyloxy)ethyl]trimethyl ammonium chloride) or protonated primary amine monomers and negatively charged acrylate monomers (e.g., 2-carboxy ethyl acrylate, 3-sulfopropyl methacrylate potassium salt). Other particular zwitterionic polymers are polymers of methacryloyl serine, N-ε-methacryloyl lysine, N-δ-methacryloyl ornithine, $N^4$-(2-methacrylamidoethyl) asparagine, or $N^5$-(2-methacrylamidoethyl) glutamine, which are all Bingdi monomers. Other particular zwitterionic polymers include the above mentioned Bingdi polymers after their primary amine is oxidized to quaternary ammonium cation.

The zwitterionic polymer can be coated or grafted onto a filter surface either by chemical adsorption or physical adsorption. Herein, chemical adsorption, or chemisorption, is to be understood as involving polymerizing the desired monomer(s) either directly or indirectly from the surface of the filter media. As used herein, physical adsorption, or physisorption, is to be understood as involving first polymerizing the desired monomer(s) to form the polymer, and then attaching the polymer to the surface of the filter media. In one or more embodiments, a single species of monomer is employed such that a homopolymer is created. In one or more embodiments, more than one species of monomer is employed such that a copolymer is created.

After creating a polymerizable mixture of the desired monomers as guided above, the polymerization is initiated and carried out. Various means can be used for initiating the polymerization depending on the initiator that is used. Means for initiation will depend on whether chemical adsorption or physical adsorption is utilized and the particular monomer(s) and filter media utilized. Polymerization can be carried in any method known to one skilled in the art. Particular methods include Atom Transfer Radical Polymerization (ATRP), Reversible Addition-Fragmentation chain Transfer (RAFT), and free radical polymerization. The polymerization generally involves the breaking of a double bond in order to initiate and continue the polymerization.

In one or more embodiments, a coating process includes the use of a copolymer of zwitterionic monomer(s) and a second monomer. Such embodiments can use either a hydrophobic copolymer or a charged copolymer. In one or more embodiments, a hydrophobic copolymer is used with a filter surface that is hydrophobic. Examples of a hydrophobic copolymer include poly[SBMA-co-n-butyl methacrylate (BMA)] or poly(MPC-co-BMA). In one or more embodiments, a charged copolymer is used with a filter surface that is charged. In these embodiments using a charged copolymer and a charged filter surface, the copolymer and filter surface have opposite charges. For example, when a charged filter surface has a positive charge, a copolymer having a negative charge is utilized.

In one or more embodiments, a coating process is selected from dip coating, roll coating, and solvent casting. Any coating process known to those skilled in the art can be utilized, so long as the coating does not substantially clog the pores of the filter media. In one or more embodiments, a material that is used to create a filter media is first coated with a zwitterionic polymer before the filter media is created.

Chemisorption, or chemical adsorption, is a kind of adsorption that involves a chemical reaction between the surface and the adsorbate. New chemical bonds are generated at the adsorbent surface. The strong interaction between the adsorbate and a substrate surface creates new types of electronic bonds.

Chemical adsorption includes the use of an initiator in order to initiate the attachment of the monomer onto a surface. Those of ordinary skill in the art will be able to determine suitable initiators (and other optional components for the polymerization of monomers, such as catalysts, ligands, cross-linking agents, or solvents) based on the desired procedure for polymerization. Similarly, one of ordinary skill in the art will be able to determine amounts of each component to create the filters of this invention. Examples of initiators that can be used include silane initiators, thiol initiators, and dopamine initiators. In one or more embodiments, a solvent is selected from the group consisting of water, methanol, ethanol, and mixtures thereof.

A particular type of chemical adsorptions is atom transfer radical polymerization (ATRP). ATRP is an example of a living polymerization or a controlled/living radical polymerization (CRP). It is a means of forming a carbon-carbon bond through a transition metal catalyst. The atom transfer step is the key step in the reaction responsible for uniform polymer chain growth. A general ATRP reaction can include the steps of initiation, equilibrium with dormant species, and propagation. In addition to the polymer being covalently attached to the surface, ATRP has several distinct advantages over other techniques such as controllable uniform film thickness, narrow polymer molecular weight distribution, and high surface coverage. In a particular embodiment of the present invention, the grafting of the zwitterionic polymer onto a surface of a filter was realized by surface-initiated atom-transfer radical polymerization (SI-ATRP).

Physical adsorption, or physisorption, is a process in which the electronic structure of the atom or molecule is barely perturbed upon adsorption. The chemical species of the adsorbate and surface are left intact. The fundamental interacting force of physisorption is caused by van der Waals force. Van der Waals forces originate from the interactions between induced, permanent or transient electric dipoles. In general, physisorption can only be observed in the environment of low temperature and the absence of the relatively strong chemisorptions.

The categorization of a particular adsorption as physisorption or chemisorption depends principally on the binding energy of the adsorbate to the substrate. The various variables and steps involved with coating or grafting a zwitterionic polymer onto a surface are generally known by one skilled in the art. Such variables can include the particular monomer, initiator, catalyst, and solvent that are chosen, and the temperature and operating parameters of the polymerization.

A surface of a filter can be coated or grafted with a zwitterionic polymer to a predetermined thickness. In one or more embodiments, the thickness of a polymer coating is 20 nm. In one or more embodiments, the thickness of a polymer coating is from 10 nm or more to 30 nm or less. In one or more embodiments, the thickness of a polymer coating is 5 nm or more. In one or more embodiments, the thickness of a polymer coating is 100 nm or less.

In one or more embodiments, a filter has a water contact angle of from 8° or more to 15° or less. In one or more embodiments, the water contact angle is 0° or more. In one or more embodiments, the water contact angle is 17° or less.

In one or more embodiments, a filter has an underwater oil contact angle where the underwater oil contact angle is the contact angle for a droplet of oil when the filter is submerged underwater of from 162° or more to 169° or less. In one or more embodiments, the underwater oil contact angle is 150° or more. In one or more embodiments, the underwater oil contact angle is 180° or less.

Zwitterionic polymers tend to exhibit oleophilic properties in an air environment. Due to this, hydrating the filter before oil-water separation prevents the filters from absorbing the oil on contact. This also further inhibits the permeation of oil through the filter by capillary effects. Good separation results can still be obtained if the filters are not initially hydrated, although a small amount of oil may permeate through the filters in these instances.

Filters of the present invention exhibit underwater superoleophobicity, and therefore possess self-cleaning properties. These properties can be used against fouling from oil as well as fouling from marine life. The present invention provided one or more of the following benefits: non-toxic and inexpensive materials, easy fabrication, rapid and efficient separation, easy cleaning, and low energy requirement. Thus, the present invention counteracts some of the disadvantages of the current membrane filtration technologies such as membrane fouling, low efficiency, and high operation costs.

Filters of the present invention having a zwitterionic polymer coated or grafted thereon can be used for applications such as oil spill clean-up, wastewater treatment, underwater marine antifouling coating, self-cleaning coating, and anti-biofouling surfaces. A particularly beneficial use is for oil-water separation.

In a particular embodiment, a filter is made with polymerized sulfobetaine methacrylate monomer, poly(sulfobetaine methacrylate) (PSBMA), and the filter is made from glass fibers and coated with the PSBMA using ATRP.

In a particular embodiment, the present invention relates to a superhydrophilic and underwater superoleophobic pSBMA-grafted glass fiber filter. In some embodiments, the monomer is sulfobetaine methacrylate, forming zwitterionic poly(sulfobetaine methacrylate) (pSBMA). pSBMA is a recently-developed superhydrophilic polymer that has been utilized as an ultralow biofouling material. pSBMA has been used in biomedical applications in order to resist adsorption from proteins, cells, and bacteria. It has also been shown that pSBMA-grafted glass slides resist fouling from marine microorganisms. These characteristics are based on strong hydration ability due to the electrostatic attractions between charges on the side groups of the polymer and the water molecules. Low-field nuclear magnetic resonance experiments reveal that an SBMA monomer tightly interacts with eight water molecules.

EXAMPLES

Materials

Unwoven glass fiber mats with an average fiber diameter of 6.5 μm and thickness of 1.4 mm were provided by Hollingsworth & Vose. The glass slides were obtained from Corning (2947-3 inches×1 inch). The monomer, N-(3-sulfopropyl)-N-(methacryloxyethyl)-N,N-dimethylammonium betaine (sulfobetaine methacrylate, SBMA, $H_2C=C(CH_3)COOCH_2CH_2N(CH_3)_2(CH_2)_3SO_3$), 2,2'-bipyridyl (bpy, 99%), copper (I) bromide (99.99%), tetrahydrofuran (THF), methanol, and oil red-O dye were purchased from Sigma-Aldrich and used as received. Hexadecane (99%) was purchased from Alfa Aesar. Sodium hydroxide was purchased from Fisher Scientific. Ethanol (absolute 200 proof) was purchased from Pharmco-AAPER. DI water was purified to a minimum resistivity of 18.0 MΩ-cm by a Millipore filter system.

The ATRP initiator, (11-(2-bromo-2-methyl)-propionyloxyl) undecyltrichlorosilane (Br-PUCS) was synthesized through the reaction of 1,3-propanesultone and 2-(dimethylamino)ethyl methacrylate using a method known in the art: $^1$H-NMR (300 MHz, CDCl$_3$) δ: 1.23-1.45 (br m, 16H); 1.54-1.75 (m, 4H); 1.93 (s, 6H); 4.16 (t, 2H) ppm.

Immobilization of the ATRP Initiator:

Glass fiber mats were cut into 1 inch (diameter) pieces from an 8.5 inch×11 inch sheet while glass slides were cut into ½×1 inch pieces. Prior to the ATRP initiator immobilization, the glass substrates were cleaned with water and ethanol, soaked in a 20 wt. % NaOH solution for approximately 24 hours, washed subsequently with DI water and ethanol multiple times, and then air dried. For the ATRP initiator immobilization, 4-6 substrates were immersed in 15 ml THF solution containing 10 μl Br-PUCS initiator and left for approximately 24 hours. The substrates were then washed with THF twice and air-dried prior to the pSBMA grafting.

Figure 1:
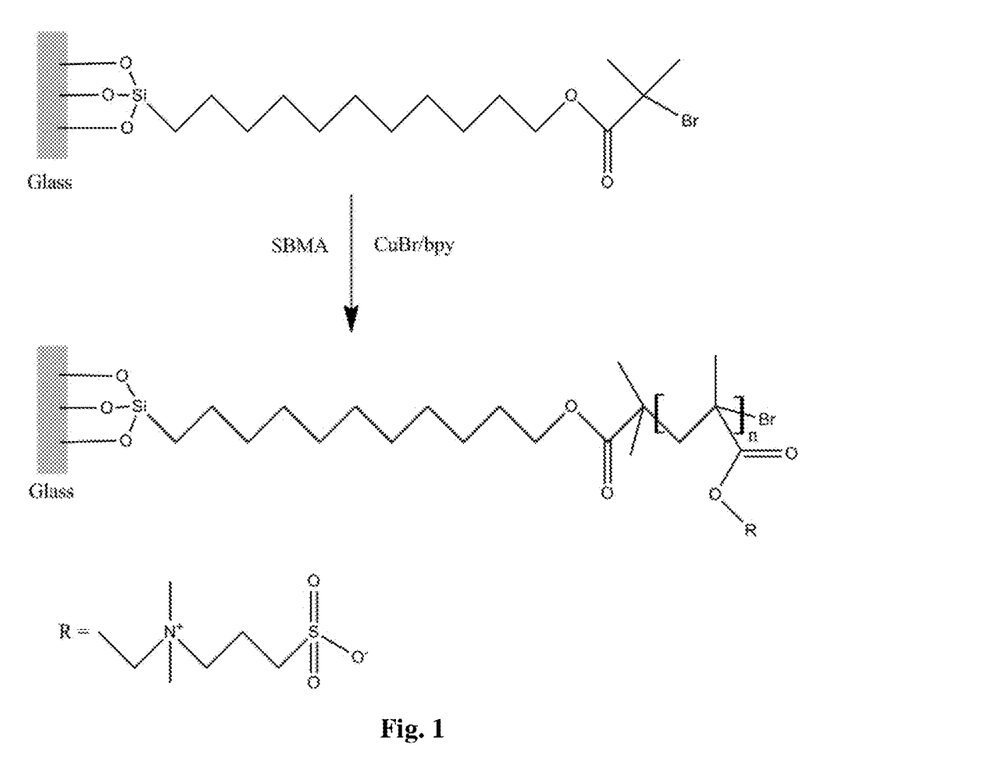
FIG. 1 is a schematic drawing showing the grafting of pSBMA on a glass surface via surface-initiated atom transfer radical polymerization.

Surface Polymerization of SBMA:

The pSBMA brushes were grafted on glass surfaces via SI-ATRP in a manner as shown in FIG. 1. The glass substrate modified with the Br-PUCS initiator, along with SBMA monomer (0.296 g), 2,2'-bypyridine (bpy) ligand (0.062 g), and Cu(I)Br (0.031 g) were placed into a test tube. The tube was then sealed with a natural rubber septum and quickly filled with nitrogen. A deoxygenated solution of methanol (7 ml) and DI water (7 ml) was then added into the reaction vessel using a syringe under nitrogen protection. The solvents were deoxygenated by passing a continuous stream of dry nitrogen through it for 30 min prior to the addition. After the ATRP reaction for the predetermined time, the substrates were removed and sequentially washed with DI-water and ethanol twice, and air dried prior to storage in a desiccator.

Surface Characterization:

Film thicknesses of the grafted polymer layers were measured using a variable angle spectroscopic ellipsometer (J. A. Woollam Co.). Data analysis was made by the WVASE32 software (version 3.610). The phase factor ($\Delta$) and amplitude factor ($\Psi$) were measured in air at room temperature in the wavelength range of 300~4000 nm at a 10-nm interval. The measurement was repeated for incident angles of 65, 70, and 75° and averaged. For the ellipsometry measurement purpose, the back sides of the glass substrates were roughened using sandpaper to prevent backside reflections. Measurements were made on the smooth side of the samples. A two layer model was used to determine the polymer film thickness.

Contact Angle Measurements:

Contact angle measurements of the glass slides were made using a Rame-Hart Goniometer. A cell containing a prism stand was used for the underwater measurements. The glass sample was placed on the stand with the polymer-modified side facing down. The cell was subsequently filled with DI water. The tip of a curved needle containing hexadecane was placed under the sample and the solution was pushed out of the syringe until an oil droplet formed. In doing this, the oil droplet is "captured" underneath the sample, and the contact angle can then be measured.

The in-air contact angle measurements used an approximate water drop size of 3-5 µl and the underwater contact angle measurements used an approximate oil drop size of 10-15 µl. At least two areas were measured on each sample. The underwater oil contact angles were analyzed with the Drop-Image software, whereas the in-air water contact angles were analyzed using the ImageJ program.

Oil/Water Separation Tests:

Oil/water separation tests were performed using an apparatus having a bottom glass piece, a cell, an O-ring, a top glass piece, and a sample mesh. In the separation apparatus, a filter sample and supporting stainless steel mesh are held in place inside a cell between top and bottom glass tubes.

A piece of glass tube (bottom piece) is embedded permanently into the bottom of a Plexiglas cell (ID=1 inch) using epoxy glue. A 1 inch-stainless steel (SS) mesh (⅛ inch pore size) was placed inside the cell for structural support. The glass fiber filter sample (1 inch diameter) was then placed on top of the stainless steel mesh followed by an additional glass tube (top piece, OD=1 inch, height=3 inches) to securely hold the fiber sample and supporting mesh in place. An O-ring was embedded inside the cell to prevent any leakage of solution between the glass tube and the cell. The whole apparatus was held vertical using a clamp which was attached to the bottom glass tube.

For the oil/water separation, 10 ml of DI water was first poured into the tube to hydrate the filter samples. Thereafter, a solution of DI water and hexadecane (20:10 mL) was rigorously mixed and poured down the top glass tube. The permeate was collected in a graduated cylinder from which the levels were recorded at various times for the water, oil, and total permeate solution. The oil red-O dye was added to the oil for visual purpose.

Results and Discussion

Figure 2:
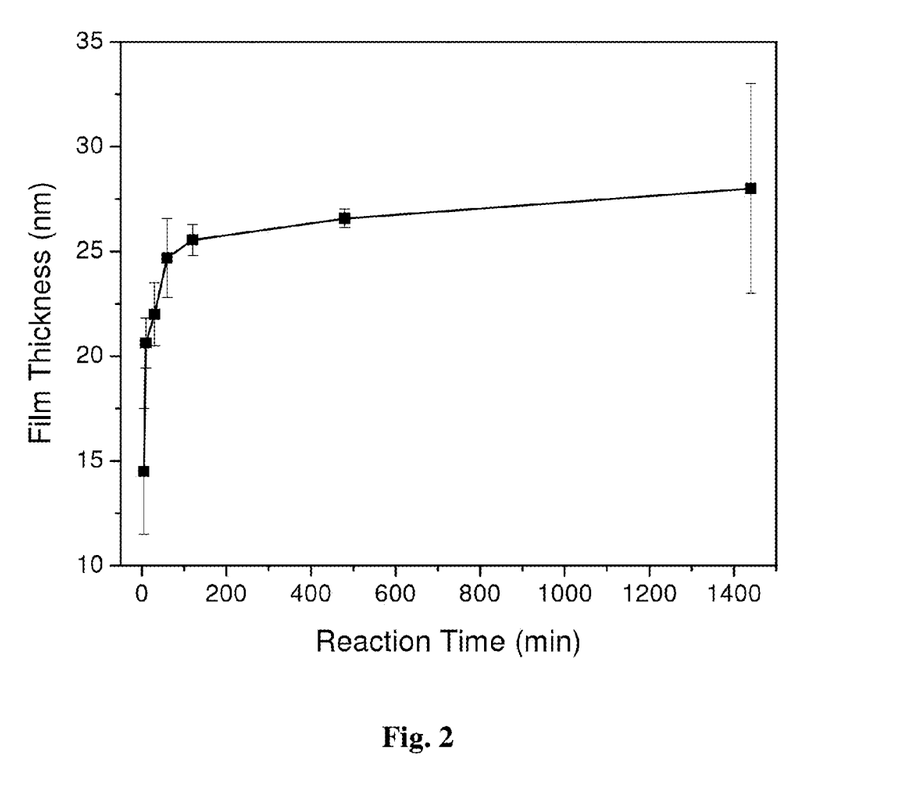
FIG. 2 is a graph showing PSBMA film thickness measured as a function of polymerization time using ellipsometry.
Figure 3:
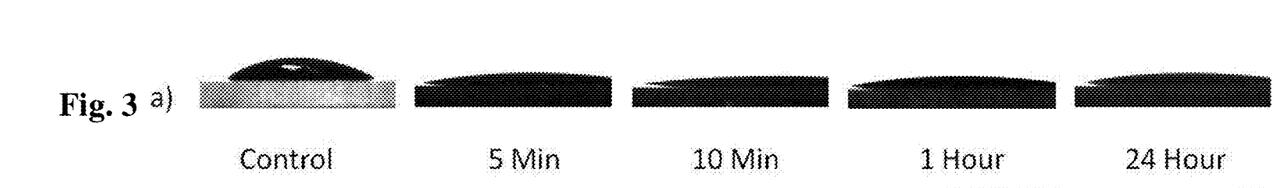
FIG. 3a is an image showing the in-air water contact angles at various pSBMA polymerization times.
FIG. 3b is an image showing the underwater hexadecane contact angles at various pSBMA polymerization times.
Figure 4A:
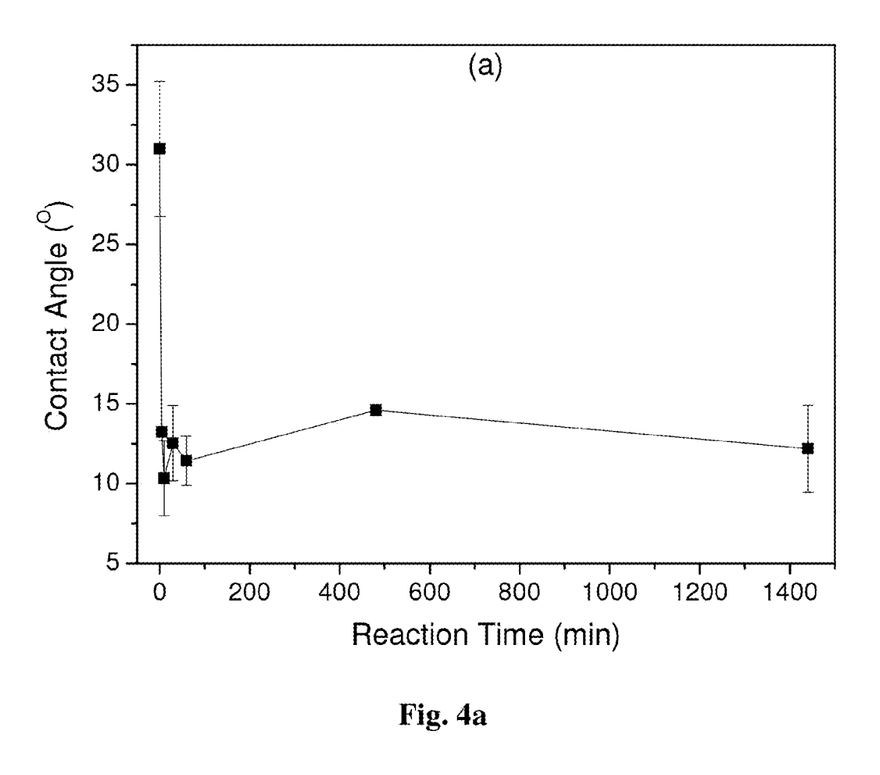
FIG. 4a is a graph showing the in-air water contact angle for pSBMA-grafted glass substrates at various reaction times. The sample with a 0 reaction time refers to the control glass without pSBMA modification.
Figure 4B:
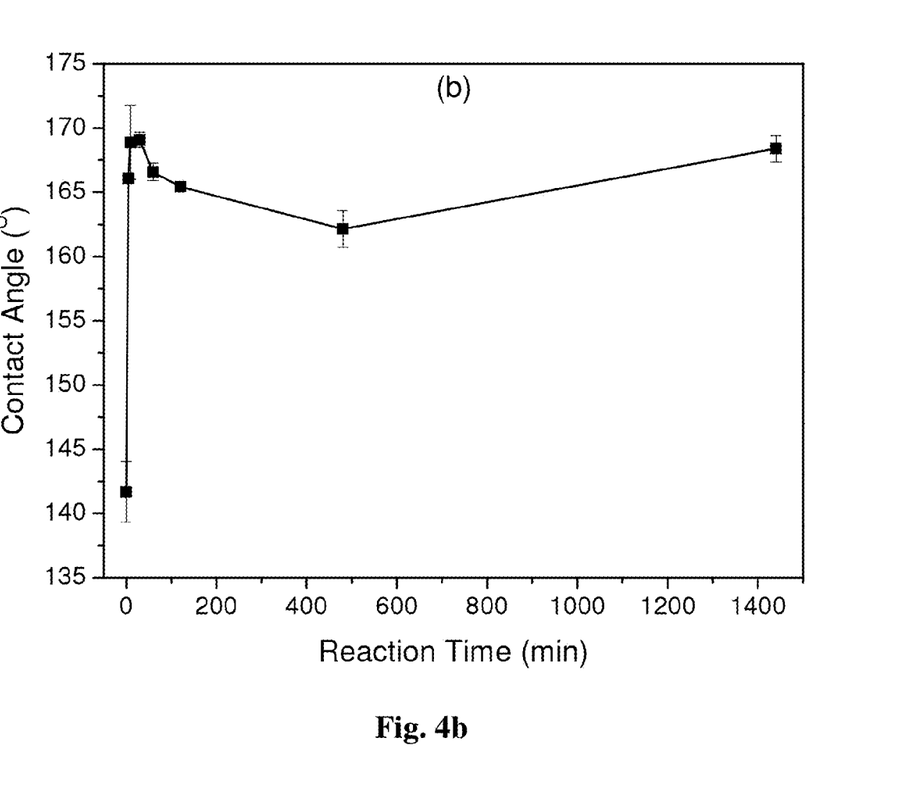
FIG. 4b is a graph showing the underwater hexadecane contact angle for pSBMA-grafted glass substrates at various reaction times. The sample with a 0 reaction time refers to the control glass without pSBMA modification.
Figure 5A:
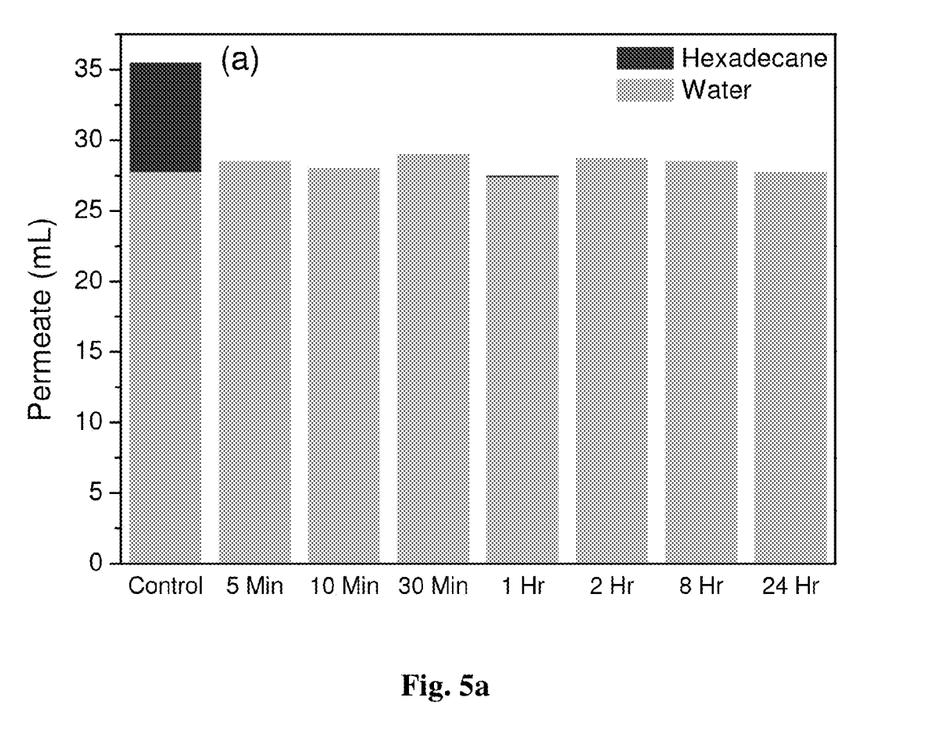
FIG. 5a is a graph showing data for oil-water separation of pSBMA-grafted glass fiber filters for various polymerization times. The graph shows the amount of permeated water, permeated oil, and total permeate after 24-hour permeation. Water (10 mL) was first used to hydrate the filters, followed by the addition of a mixed water:hexadecane solution (20 mL:10 mL).
Figure 5B:
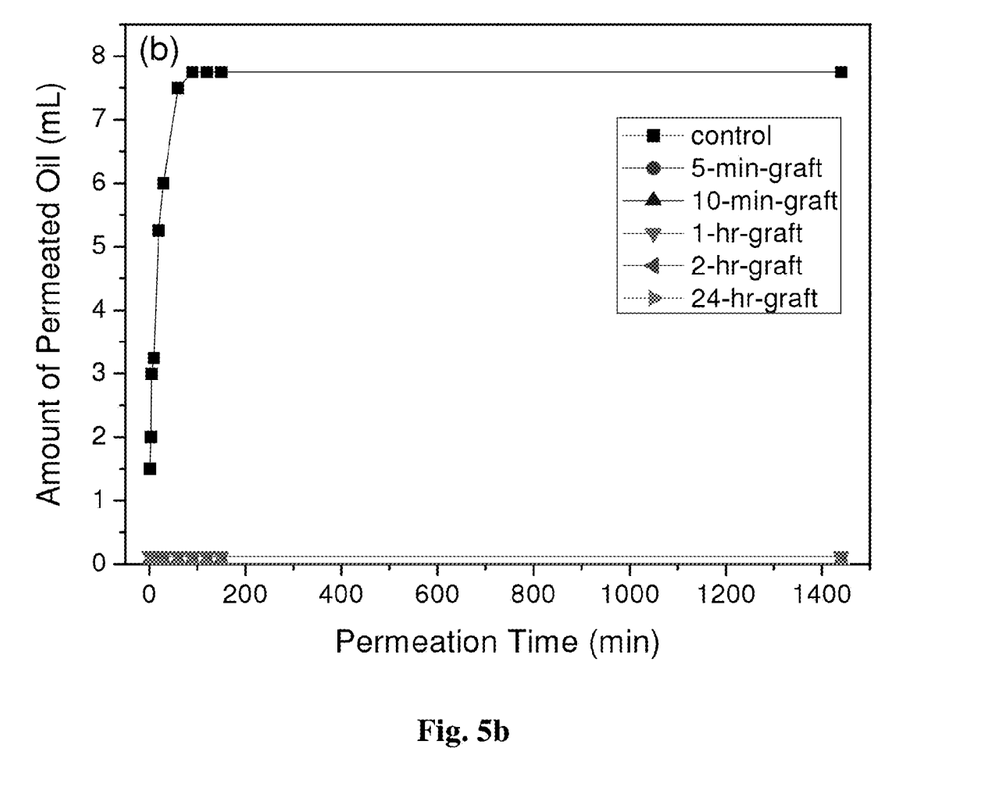
FIG. 5b is a graph showing data for oil-water separation of pSBMA-grafted glass fiber filters for various polymerization times. The graph shows the amount of permeated oil with increasing permeation time. Water (10 mL) was first used to hydrate the filters, followed by the addition of a mixed water:hexadecane solution (20 mL:10 mL).

The ellipsometry results in FIG. 2 show that the pSBMA thickness increases with the ATRP time, therefore confirming that the grafting of pSBMA onto the substrates was successful. The film thickness increased quickly within the first two hours to ~25 nm. Thereafter a gradual increase was seen, and a film thickness of ~28 nm was seen after 24 hours. The much slower rate of increase of the film thickness was due to either the deactivation of materials and/or termination of the long polymer chains via self-association at later stages of the polymerization. Other thicknesses could be achieved by the use of different materials (initiators, catalyst/ligand), substrates (gold, glass, or silicon), or experimental conditions (concentration, reaction time).

The wettability of the pSBMA grafted glass slides was characterized via contact angle measurements as shown in FIGS. 3a, 3b, 4a, and 4b. The average in-air water contact angle (FIG. 4a) of the control glass slide, represented as the 0 reaction time, was 31°, while the water wettability increased towards superhydrophilicity with contact angles of ~8-15° for the pSBMA-grafted glass slides. Even though the pSBMA film thickness increases over polymerization time, as shown in the ellipsometry results, the in-air water contact angles do not become more hydrophilic with time.

Similarly, underwater oil contact angles (FIG. 4b) on the pSBMA-grafted glass slides resulted in an increase towards underwater superoleophobicity with contact angles of 162-169°, while the control pristine glass slide had a contact angle of 142°. This increase in superoleophobicity is acquired due to water being trapped at the solid-oil-water interface by the polymer layer, thus effectively preventing strong adhesion of oil. It was also observed that if the prism stand of the goniometer for samples was not perfectly leveled, the oil droplet would start moving, thus suggesting low tilt angles for the pSBMA-grafted samples. The contact angle characterizations of the pSBMA-grafted glass fiber mats were not possible due to flexibility and intrinsic absorbing property of the substrates.

The pSBMA-grafted glass slides exhibit the underwater antifouling (oil-resistant) characteristics. When a pSBMA-grafted glass slide was placed in water after being dipped in oil, the oil droplets easily floated up. Conversely, the oil droplets gathered together onto the surface of the control pristine glass slide. Even after mild agitation in the water, the control sample still retained some amount of oil on its surface. These observations suggest that the pSBMA-grafted surfaces are self-cleaning and oil-resistant underwater. A similar observation was observed with fish scales, where fish exhibit superoleophilicity in air and superoleophobicity underwater, and therefore are self-cleaning in oil-polluted water. Furthermore, the pSBMA-grafted glass fiber mats, after being hydrated and placed in an oil environment, were not fouled, therefore they are also self-cleaning underwater.

In the experimental setup for oil-water separation, the pSBMA-grafted glass fiber samples were placed inside the Plexiglas cell on a SS mesh that was used for structural support purpose. After hydrating the samples with DI water, the water/hexadecane mixture was poured into the top glass tube. It was found that the water selectively permeated through the pSBMA-grafted filter while the oil was retained above the sample. Even samples grafted with pSBMA for 5 minutes can be effectively used to completely prevent the oil from permeating through the filter, while allowing the water to quickly permeate within seconds. Although the water permeation and separation also happened for the control fiber filters within seconds, most of the oil permeated through within one hour, while the oil was retained on the top for the pSBMA-grafted samples for over 24 hours.

Not only do the pSBMA-grafted filters effectively separate oil from water, they can also be easily cleaned with water and ethanol and reused, and the separation requires no additional force other than the gravitational force. Thus, such filters are good candidates for industrial oil-water separation.

Due to the in-air oleophilic property of the pSBMA-grafted samples, the filters were first hydrated with water before the oil-water separation test. This prevented the samples from absorbing the oil on contact and further inhibits the permeation of oil through the filter by capillary effects. Hexadecane, an aggressive foulant with a low surface energy of 26.9 mN/m, was used as the model oil. During the oil-water separation, the underwater superoleophobic property of the pSBMA grafted-samples, which is due to the presence of a strong hydration layer associated with the polymer brushes between the surface and oil and the high repellency between the non-polar (oil) and polar (water, pSBMA) molecules, prevents oil droplets from adhering therefore making oil separation and material recycling very easy.

Good separation results were still obtained if the pSBMA-modified filters were not initially hydrated, although small amount of oil did permeate through the filters during the initial stage after pouring the oil-water mixture. The oil stopped permeating thereafter, presumably when the entire sample was quickly hydrated with water due to its superhydrophilic property. The oil did not further permeate for over 24 hours. With the control glass fiber filter, if not initially hydrated, the oil rapidly permeated the filter within a few minutes.

Scanning electron microscopy (SEM) was used to characterize surface morphologies of the glass fibers, both before and after pSBMA grafting. A SEM image of the control glass fiber with no pSBMA modification, showed a porous unwoven fiber structure with an average fiber diameter of 6.5 µm and a pore range of 50-350 µm. SEM images were also taken for the 5-min and 1-h pSBMA-grafted samples. The diameters of the pSBMA-grafted glass fibers remained about 6.5 µm, thus showing no significant change after the ATRP grafting step. There were also no materials within the pores, therefore ensuring free passage of solutions through the pores. Surfaces of the modified fibers appeared smooth with no visible topographical features at the 5 µm scale. Overall, the pSBMA grafting does not cause significant morphological changes of the glass fibers, implying that the superhydrophilicity and underwater superoleophobicity are mostly achieved via surface chemistry and not by surface roughness.

The fact that amphiphilic surfaces in air turn to be superhydrophilic-superoleophobic underwater, indicates that oil contaminants can be easily washed away when immersed in water, therefore such coating is self-cleaning and can be used against marine ship fouling. Furthermore, studies have found that upon heating or addition of salt, pSBMA shows enhanced water wettability due to the self-association state being reversed. The filters of the present invention are therefore expected to perform even better, and can be used under harsh conditions such as high temperatures and high salt concentrations.

Various modifications and alterations that do not depart from the scope and spirit of this invention will become apparent to those skilled in the art. This invention is not to be duly limited to the illustrative embodiments set forth herein.

In light of the foregoing, it should be appreciated that the present invention significantly advances the art by providing improved fiber filters and methods of making. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A filter for the separation of oil and water from oil-water mixtures comprising:
   a porous filter media having a coating thereon, the coating consisting of one or more zwitterionic polymers, wherein the one or more zwitterionic polymers includes a zwitterionic polymer made from a monomer selected from the group consisting of N-δ-methacryloyl ornithine, N4-(2-methacrylamidoethyl) asparagine, and N5-(2-methacrylamidoethyl) glutamine.

2. The filter of claim 1, wherein the porous filter media comprises glass fibers.

3. The filter of claim 1, wherein the filter has a water contact angle of approximately 8-15° and an underwater oil contact angle of approximately 162-169°.

4. A method of separating oil and water from oil-water mixtures comprising the steps of:
   providing the filter of claim 1;
   introducing to the filter an oil-water mixture containing oil and water; and
   allowing the water to selectively permeate through the filter while simultaneously retaining the oil from permeating through the filter.

5. The method of claim 4, wherein the porous filter media comprises glass fibers.

6. A filter for the separation of oil and water from oil-water mixtures comprising:
   a porous filter media having a material grafted thereto, the grafted material consisting of one or more zwitterionic polymers, wherein the one or more zwitterionic polymers includes a zwitterionic polymer made from a monomer selected from the group consisting of N-δ-methacryloyl ornithine, N4-(2-methacrylamidoethyl) asparagine, and N5-(2-methacrylamidoethyl) glutamine.

7. The filter of claim 1, wherein the monomer is N-δ-methacryloyl ornithine.

8. The filter of claim 1, wherein the monomer is $N^4$-(2-methacrylamidoethyl) asparagine.

9. The filter of claim 1, wherein the monomer is $N^5$-(2-methacrylamidoethyl) glutamine.

10. The method of claim 4, wherein the porous filter media comprises a polymeric filter media selected from the group consisting of polytetrafluoroethylene (PTFE), polyethylene, and polyurethane.

11. The method of claim 4, wherein the porous filter media comprises a metal filter media selected from the group consisting of stainless steel and copper.

* * * * *